United States Patent [19]

Nakajima et al.

[11] Patent Number: 5,090,715
[45] Date of Patent: Feb. 25, 1992

[54] MOVABLE STEP FOR MOTORCYCLE

[75] Inventors: Jun Nakajima, Tokyo; Yoshihiro Funayama, Asaka; Kazuyoshi Otsuka, Higashimatsuyama, all of Japan

[73] Assignee: Honda Giken Kogyo Kabushiki Kaisha, Tokyo, Japan

[21] Appl. No.: 515,123

[22] Filed: Apr. 27, 1990

[51] Int. Cl.⁵ ............................................... B60R 3/00
[52] U.S. Cl. ..................... 280/166; 180/219; 296/75
[58] Field of Search ............... 280/163, 165, 166, 169, 280/291, 762; 180/219; 182/91; 296/75

[56] References Cited

U.S. PATENT DOCUMENTS

| | | | |
|---|---|---|---|
| 1,261,442 | 4/1918 | Rigby | 280/291 |
| 4,174,852 | 11/1979 | Panzica et al. | 280/291 |
| 4,546,993 | 10/1985 | Walker | 780/166 |
| 4,802,684 | 2/1989 | Bennett et al. | 280/291 |

Primary Examiner—Andres Kashnikow
Assistant Examiner—Richard Camby
Attorney, Agent, or Firm—Pollock, Vande Sande & Priddy

[57] ABSTRACT

A movable foot rest for motorcycles, easily adjustable upwardly and downwardly, as well as forwardly and rearwardly, so as to provide optimum comfort to riders of different physiques, and under various travel conditions.

2 Claims, 5 Drawing Sheets

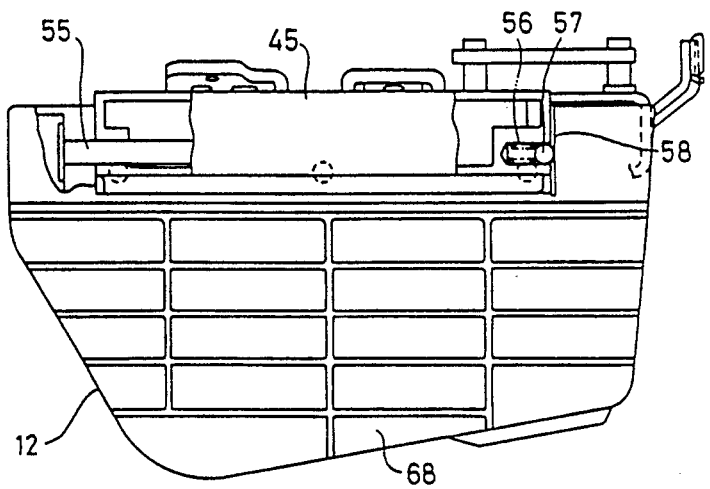
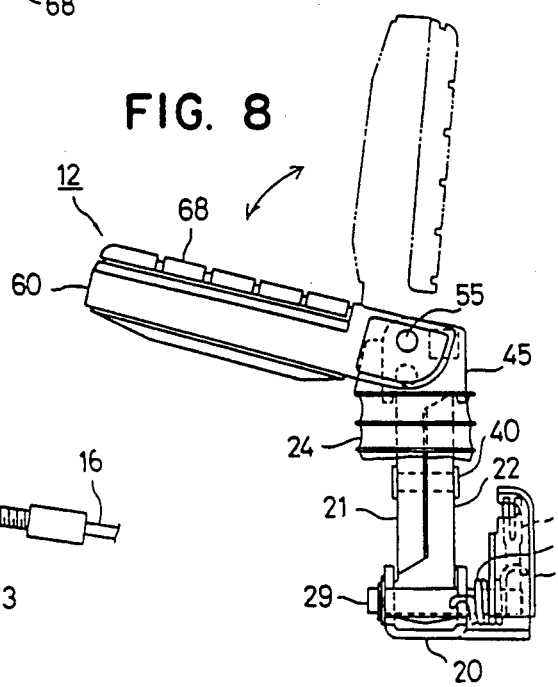
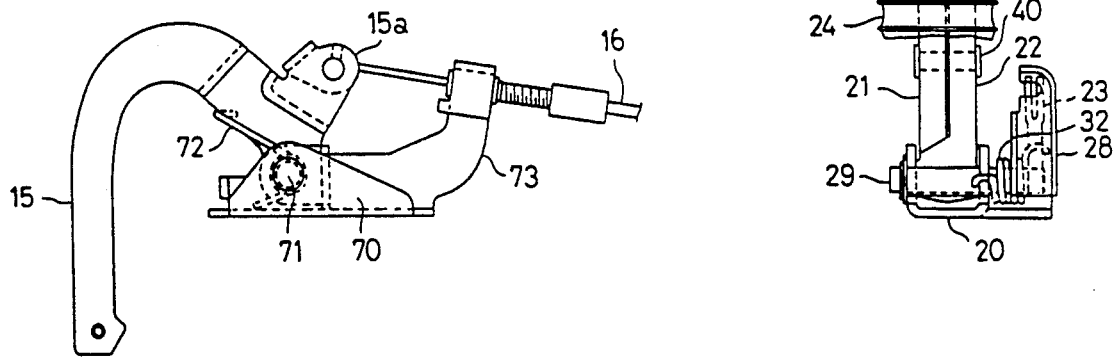
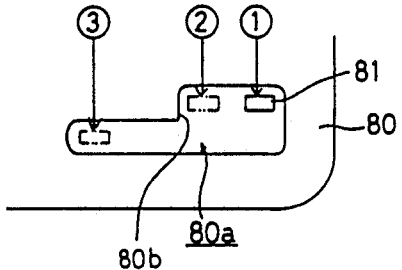
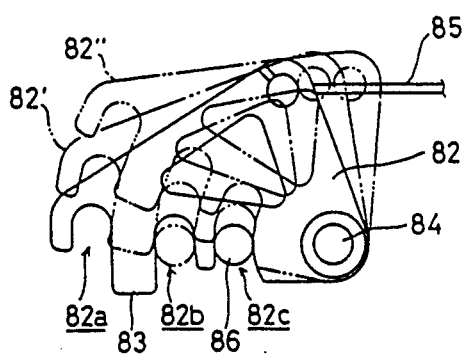

MOVABLE STEP FOR MOTORCYCLE

FIELD OF THE INVENTION

The present invention relates to a motorcycle foot rest.

PRIOR ART

Normally, the foot rest for a motorcycle is located in a standard position on each side of the vehicle body, to provide support for the feet of a person of average physique riding astride on the seat of the motorcycle.

However, this means that the foot rest is not necessarily in an optimum position for all riders. In addition, optimum position of the foot rest must be adjusted in dependency on the conditions of travel, e.g., city travel, suburban travel, long distance travel, and the like.

One example of means for adjusting the position of the foot rest is shown in FIG. 1, and is disclosed in Japanese Published Utility Model No. 61-29987 (No. 29987/1986).

As shown in FIG. 1, a step 02 is fixed to a rotary pin 01 which projects horizontally from both sides of the vehicle body transversely of the latter. Step 02 rotates about the rotary pin 01 so as to permit free adjustment of the angle of the foot rest.

Thus, a passenger can rest his or her foot on the foot rest at an optimum angle by merely adjusting the latter to the prevailing condition of travel.

However, the effect obtained by merely changing the angle of the foot rest is neither sufficient nor comfortable.

During long distance travel, the fatigue felt by a driver or passenger can be reduced, by providing both a standard position and a higher than standard position, so that the feet can be moved from one of these positions to the other.

During city travel involving frequent starts and stops, the foot rest is desirably in its high position in order to effectively retain the driver's foot.

Another advantage of the two-position foot rest is that it can be adjusted according to the physical dimensions of the user.

SUMMARY OF THE INVENTION

The object of the present invention is to provide a movable foot rest capable of simple upward and downward displacement, and on which a secure footing in an optimum position can be obtained according to various circumstances.

In one of its aspects, the invention comprises a movable motorcycle foot rest comprising a supporting mechanism capable of moving the foot rest up and down, actuating means for biasing the foot rest in an upward direction, a lock mechanism adapted to maintain the foot rest at an appropriate elevation, a manipulating knob mounted on the vehicle body, and a transmitting member extending from the manipulating knob and connected to the lock mechanism.

The foot rest is kept at an appropriate height, and when it is desired to change the height, the manipulating knob is manipulated to release the lock mechanism through the intermediary of the transmitting member, causing the foot rest to be lifted by the actuating means. The driver then treads on the foot rest with his foot so as to actuate the lock mechanism at the appropriate position with manipulation of the manipulating knob and to retain the foot rest, whereby the height of the foot rest can be simply changed.

It is possible to easily alter the height of the foot rest while riding the motorcycle.

Since the foot rest supporting mechanism can be constituted to raise the foot rest and simultaneously to displace it forwardly, the foot rest can be adjusted to its optimum position by displacing not only in the up and down directions by also in the front and rear directions.

In another aspect, the invention is a movable foot rest for a motorcycle, comprising a supporting means capable of moving the foot rest up and down, means for transmitting motion only in a direction driving said supporting means, and means for driving said supporting means through the intermediary of said motion transmitting means.

The driving means is capable of driving the supporting means through the intermediary of the motion transmitting means and to displace the foot rest up and down, and, since the motion transmitting means only transmits motion from the driving means and prevents reverse motion from the supporting means, the foot rest is maintained at its desired position Accordingly, the driver can adjust the height position of the foot rest simply and without excessive effort.

BRIEF DESCRIPTION OF THE DRAWINGS

In order that the invention may be more clearly understood, reference will now be made to the accompanying drawings, in which several embodiments are shown for purposes of illustration, and wherein:

FIG. 7 is a plan view of FIG. 6.

FIG. 8 is a rear view of FIG. 6.

FIG. 9 is a plan view showing a swinging mechanism of a manipulating lever.

FIG. 10 is a schematic view of a manipulating lever in another embodiment.

FIG. 11 is a side view showing a lock mechanism of a stopper arm in the embodiment of FIG. 10.

DESCRIPTION OF PREFERRED EMBODIMENTS

Figure 2:
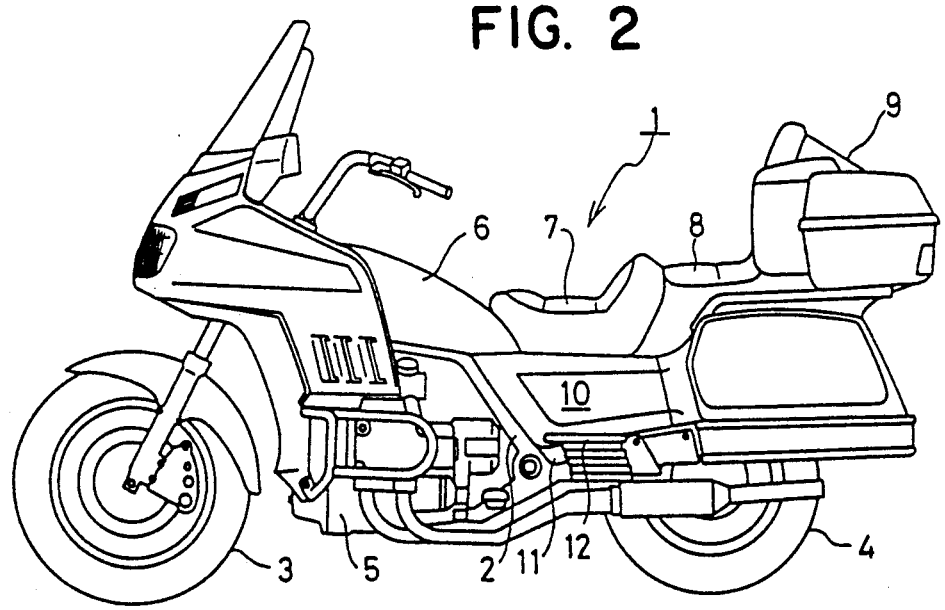
FIG. 2 is a side view of a motorcycle according to one embodiment of the present invention.
Figure 3:
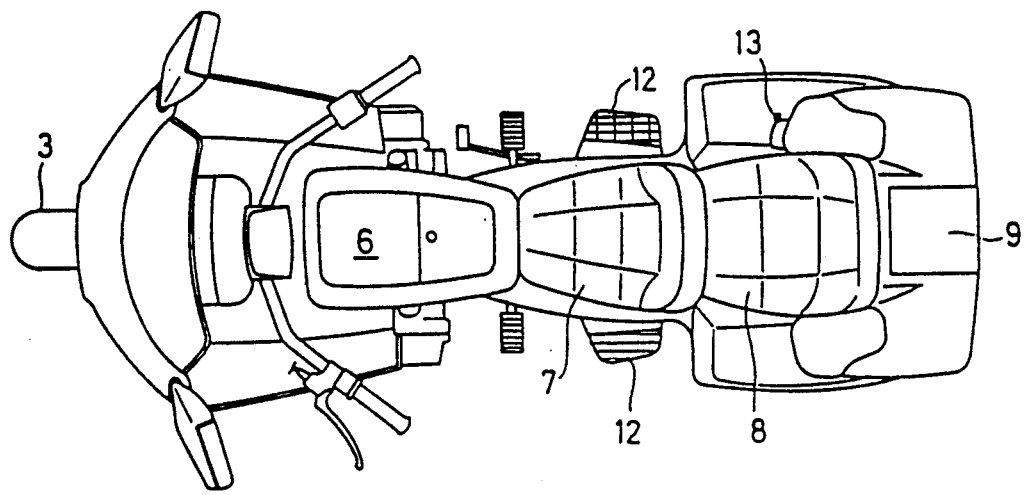
FIG. 3 is a plan view of FIG. 2.

As shown in FIGS. 2 and 3, on a vehicle body frame 2 of the motorcycle 1 is carried an engine 5 located between a front wheel 2 and a rear wheel 4, a fuel tank 6 disposed above the engine 5, a driver's seat 7 disposed behind the fuel tank 6, and a passenger seat 8 with a back rest extending to the rear of the driver's seat 7. A trunk 9 is provided behind the passenger seat 8.

Left and right side surface fairings 10 cover both side surfaces of the vehicle body below the driver's seat 7, and a lower portion of the latter is covered with foot rest assembly cover 11. On each of lateral portions of the side surface fairings 20 is held a foot rest 12 capable of up and down movement.

The trunk 9 can be expanded to the left and right at the rear portion of the passenger seat 8, a manipulating knob 13 being mounted on a front wall of the right expanded side.

The manipulating knob 13 is disposed near a lower portion of the back rest of the passenger seat 8 and, when the passenger sits astride this seat, is located at the right side of the passenger so that it can easily be manipulated during operation of the motorcycle.

Figure 4:
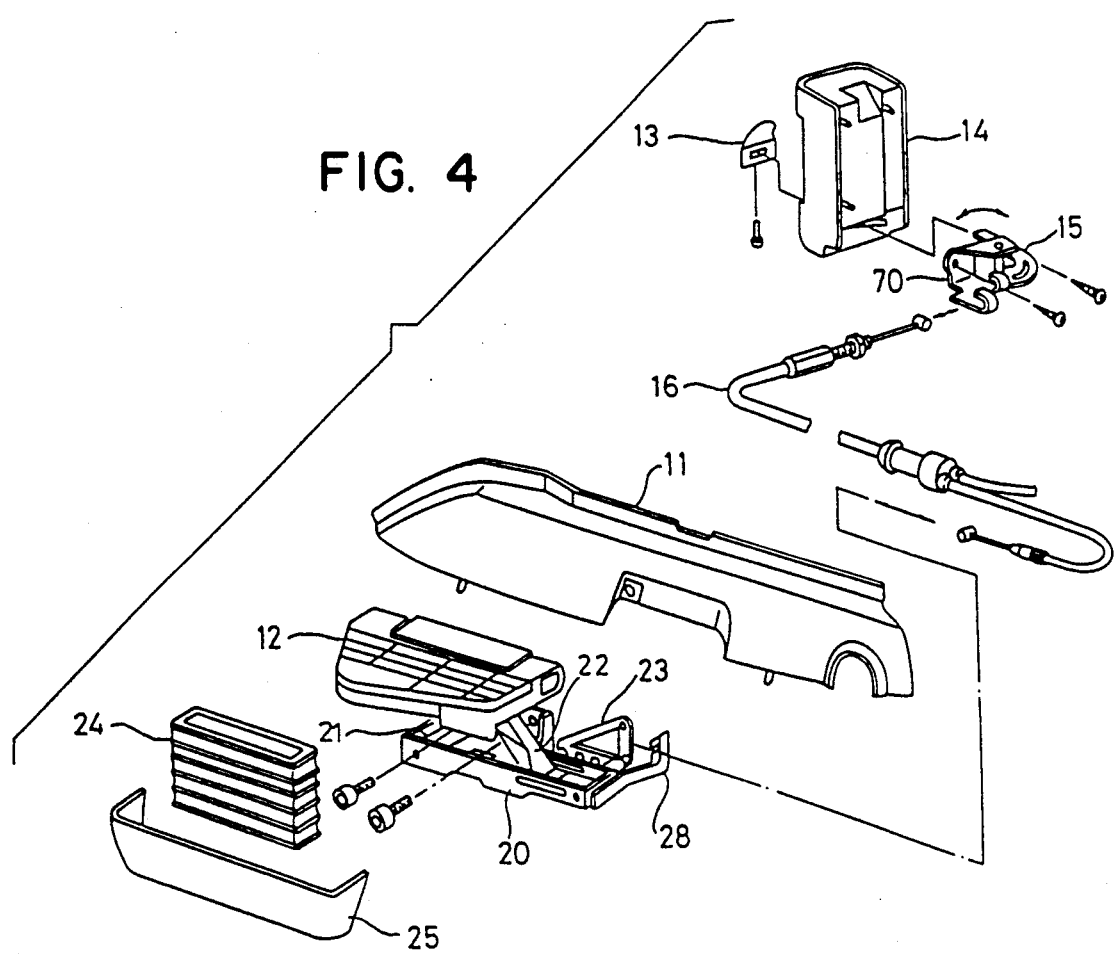
FIG. 4 is a partially exploded perspective view showing a foot rest driving mechanism.

FIG. 4 is an exploded schematic perspective view showing a driving mechanism leading from the manipulating knob 13 to the passenger foot rest 12 and its peripheral parts.

FIG. 4 shows a cover member 14 which is fixed to the front wall of the right hand expanded side of trunk 9 so as to cover a pivotal base end portion of a manipulating lever 15, whose leading end swingably projects outwardly from the cover member 14, the manipulating knob 13 being fixed to this projecting leading end.

To the manipulating lever 15 is connected one end of an adjustment cable 16 bifurcated at its center, one end being directed to the left side passenger foot rest 12 and the other end to the right side passenger foot rest 12.

The passenger foot rest 12 which is provided along a side of the foot rest assembly cover 11 is liftably supported on a supporting base 20 through the intermediary of link members 21, 22 combined in an "X" shape. On the supporting base 20 is provided a stop arm 23 of a lock mechanism holding the link members 21, 22, one end of the adjustment cable 16 being attached to the stop arm 23.

The link members 21, 22 are covered with bellows-like link boots 24, and the lateral portion of supporting base 30 is covered by a bracket cover 25.

The mechanism for lifting the foot rest 12 will now be described with reference to FIGS. 5 to 8.

Figure 6:
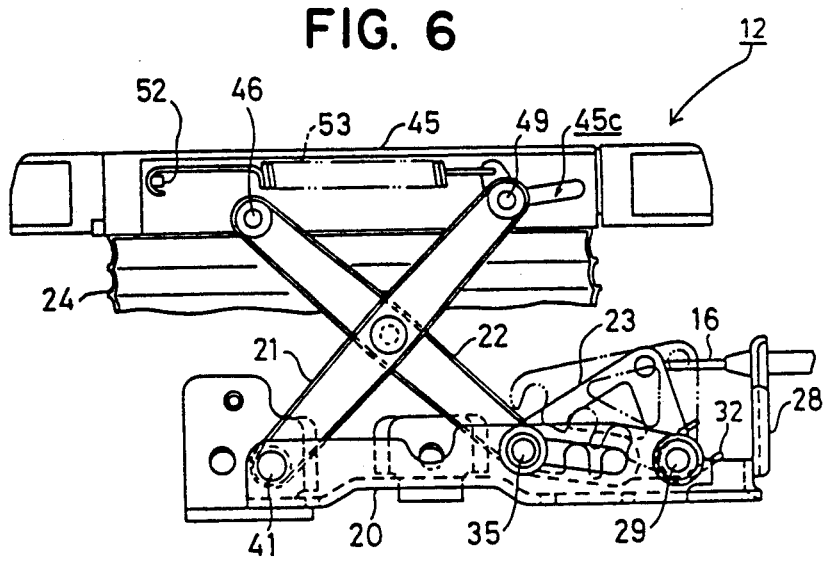
FIG. 6 is a side view of the lifting mechanism of FIG. 5.
Figure 5:
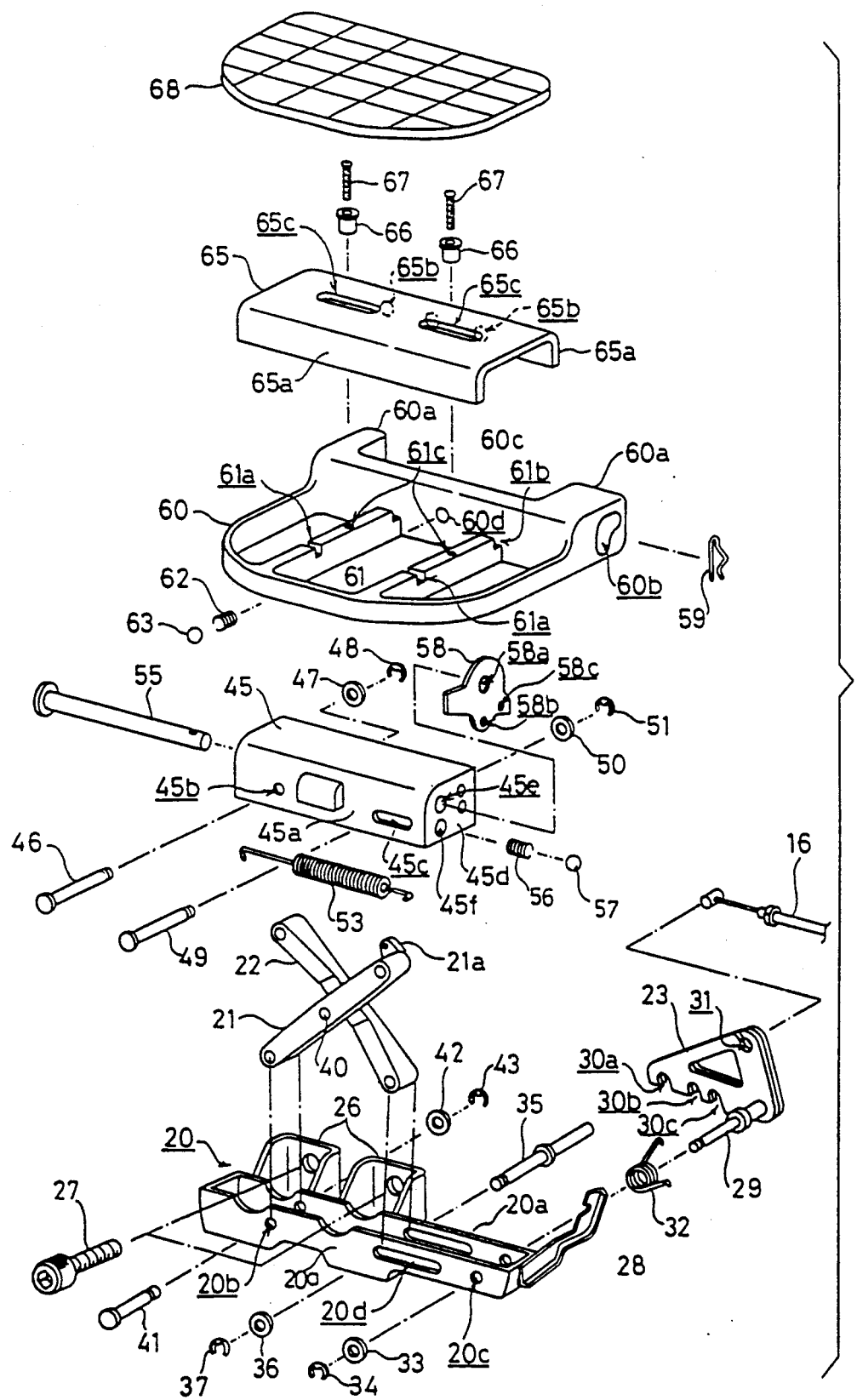
FIG. 5 is an exploded perspective view showing a foot rest lifting mechanism.

FIG. 5 is an exploded perspective view showing the lifting mechanism, FIG. 6 is a side view showing the same in assembled condition, FIG. 7 a plan view corresponding to FIG. 6, and FIG. 8 is a rear elevation also corresponding to FIG. 6.

The supporting base 20 has the shape of longitudinal rectangular box, its left and right side plates 20a being symmetrical, and each being provided with front and rear circular bores 20b, 20c and an elongated bore 20d.

On the inner side plate 20a is fixed a bracket 26 for attaching the latter on the vehicle body frame, the bracket 26 being secured to the vehicle body frame by means of a bolt 27.

At a rear transverse plate of the supporting base 20 is arranged a cable holder 28 which is fixed at its lower portion and which is adapted to project from the supporting base 20.

The stop arm 23 has the shape of a right triangle and a bearing pin 29 is plated in a corner of its right hand angle so as to project outwardly. Three spaced recesses 30a, 30b, 30c are formed in the bottom side of the triangle. In an upper corner of the triangle is provided a partially cut out circular hole 31 which is adapted to receive the end of the adjustment cable 16.

A torsion spring 32 is wound on a bearing pin 29 fixed on arm 23, and the bearing pin 29 is inserted into the rear circular bore 20c provided in the left and right side plates 20a of the supporting base 20 from inside and is fitted on the outer side plate at its portion projecting from the latter with an E-ring 34 through the intermediary of a washer 33.

Accordingly, the supporting base 20 supports the stopper arm 23 for pivoting movement about bearing pin 29.

At the same time, one end of the torsion spring 32 engages the supporting base 20 side while its other end engages a rear edge of the stopper arm 23, whereby the latter is always biased in a counterclockwise direction, as seen in FIG. 5.

Into the elongated bores 20d provided in the left and right side plates 20a of the supporting base 20 is inserted, from the inner side plate 20a, a slide pin 35 which has a central flange for determining left and right positions. The slide pin 35 passes through a lower end of the one link member 22 between the left and right side plate and projects outwardly, and E-ring 37 being fitted on the projecting portion through the intermediary of a washer 36.

Accordingly, the slide pin 35 is guided by the elongated bore 20d of the supporting base 20 to slide in front and rear directions, whereby at the same time the lower end of the link member 22 slides in the front and rear directions.

The right half portion of slide pin 35 projects inside the supporting plate 20 and is adapted to fit any of the recesses 30a, 30b, 30c formed in the lower edge of the stopper arm 23. Since the stopper arm 23 is biased in the counterclockwise direction by the torsion spring 32, the recesses portions are positively fitted on the slide pin 35.

The outer cable of the adjustment cable 16 is fixed to the cable holder 28, while one end of its inner cable is engaged in the upper circular hole 31 in the stopper arm 23.

Accordingly, the stopper arm which is normally fitted on the slide pin 35 by means of the torsion spring 32 and which is in the lock condition adapted to prevent front and rear sliding movements of the slide pin 35, swings upwardly against the torsion spring 32 when the inner cable of the adjustment cable 16 is tensioned, thereby permitting the slide 35 to slide in the front and rear directions.

Link members 21 are combined in X-shape and are supported by a pin 40 at their centers so as to be capable of rotating relative to each other. Lower ends of the link members are loosely fitted between the left and right side plates 20a of the supporting base 20. The lower end of one link member 22 is traversed by slide pin 35, as already explained. The lower end of the other link member 21 is traversed from outside by a fixing pin 41 on which a flange is formed at one end in correspondence with the front circular bores 20b provided in the left and right side plates 20a of the supporting base 20. On the end projecting inside the side plate 20a is fitted an E-ring 43 through the intermediary of a washer 42.

Accordingly, the link member 21 is swung by having the fixing pin 41 as a center.

Upper ends of the link members 21, 22 are loosely fitted in a foot rest holder 45 which is a rectangular box with an open bottom.

In left and right side walls 45a of the foot rest holder 45 lengthened in front and rear directions are symmetrically provided a circular hole 45b at the front portion and an elongated hole 45c at the rear portion. The front circular hole 45b is aligned with a circular hole in the upper end of the link member 22 so as to permit a fixing pin 46 to pass through them, and on an end of the fixing pin 46 is fitted an E-ring 48 through the intermediary of a washer 47.

The rear elongated hole 45c is aligned with a circular hole in the upper portion of the link member 21 so as to permit a slide pin 49 to pass through them, and on an end of the slide pin 49 is fitted an E-ring 51 through the intermediary of a washer 50.

A tension spring 53 is suspended between an engaging piece 21a provided on the upper end of the link member 21 and an engaging portion 52 projected at a front position inside the foot rest holder 45.

Accordingly, the foot rest holder 45 is supported through the intermediary of the link members 21, 22 on the supporting base 20. Since the lower end of the link member 22 is capable of sliding in the front and rear directions when the lock due to the stopper arm 23 has been released, and the upper end of the link member 21 also is capable of sliding in the front and rear directions along the elongated hole 45c of the foot rest holder 45 when the relative angle of the link members 21 and 22 is changed as mentioned above, the link members 21, 22 are permitted to stand or to fall, whereby the foot rest holder 45 is capable of moving up and down with respect to the bracket 26.

Since the link members 21, 22 are always biased to stand by the force of tension spring 53, when the foot rest holder 45 is not influenced by any outside force, they tend to be located in lifting position, and the foot rest holder 45 is subjected by a force to direct downwardly, it can be pressed downwardly against the force of tension spring 53.

In each of front and rear side walls 45d of the foot rest holder 45 is provided a circular hole 45e through which a pin 55 passes in the front and rear directions. In the rear side wall is formed a recess 45f as a partially thick portion (see FIG. 7) in which a spring 56 is fitted and a steel ball 57 is press fitted from outside.

On a rear surface of the foot rest holder 45 is added a click plate 58, a circular hole 58a of which is rotatably traversed by the pin 55. The steel ball 57 press fitted in the recess 45f of the foot rest holder 45 is fitted in either of circular holes 58b, 58c equidistant from the circular hole 58a, whereby the click plate 58 can be retained in two fixed positions.

The foot rest holder 45 supports foot rest 12, capable of swinging between vertical and horizontal positions. A foot rest base plate 60 is provided with a rectangular cut-out on its side edge to accommodate the foot rest holder 45. Between front and rear projecting portions 60a, 60a are inserted the front and rear side walls 45d of the foot rest holder 45, the pin 55 passing through the foot rest base plate 60 and the foot rest holder 45 from front to rear, whereby base plate 60 is supported for pivoting movement about the pin 55. The rearwardly projecting portion 60a of base plate 60 comprises a bore 60b in which the click plate 58 is fitted through the intermediary of a lock pin 59.

Accordingly, base plate 60 has two holding positions, namely a vertical position and a horizontal position capable of pivoting with respect to the foot rest holder 45, by fitting of the circular holes 58b, 58c of the click plate 58 and the steel ball 57 (see FIG. 8).

Base plate 60 has two ribs 61 extending from its leading end side to the base end side, each rib 61 being provided with respectively aligned cut out portions 61a, 61b and a bolt hole 61c at its center.

Also provided, in a side wall 60c of the base end of base plate 60, is an orifice 60d in which a spring 62 is fitted and then a steel ball 63 is press fitted.

A rectangular foot rest plate 65 mounted on base plate 50 comprises downwardly bent rail portions 65a which are fitted into the cut out portions 61a, 61b provided in the ribs 61 of base plate 60 to facilitate forward and rearward sliding movement.

In the inner rail portion 65a of plate 65 are provided three aligned circular holes 65b from which a head of the steel ball 63 press fitted in the recess 60d of the side wall 60c of based plate 60 side projects to fit any of these circular holes, thereby to determine the front and rear positions of plate 65.

Accordingly, foot rest plate 65 has three fixed positions which can be selected, i.e., front, intermediate and rear positions. Once the desired position has been determined, a pressure member 66 is fitted into a slot 65c provided in plate 65 corresponding to bolt hole 61c, enabling a bolt 67 to pass through the pressure member 66 and to be threadedly engaged and firmly tightened in bolt hole 61c to press down plate 65 through the intermediary of a flange of the pressure member 66.

Finally, rubber mat 68 is positioned on plate 65.

When thus assembled, the foot rest is a structure as shown in FIGS. 6 to 8, which show the foot rest with plate 65 in the lifting position and retained in the lock condition by stopper arm 23.

When foot rest plate 65 is not in use, it is moved upwardly into vertical position in order to avoid excessive projection, and, when required, it is used as a foot rest by moving it into a horizontal position.

The just described mechanism is identical for the foot rests on both sides.

As shown in FIG. 9, the manipulating lever 15 which permits pivoting of stopper arm 23 of the lock mechanism has a J-shape, as shown in FIG. 9, and its base end portion is pivotably supported on a lever supporting base 70 through the intermediary of a bearing pin 71, the manipulating lever 15 being biased by a torsion spring 72 wound on the bearing pin 71 in a clockwise direction as shown in FIG. 9.

Adjacent to the pivoting portion of the manipulating lever 15 is a projecting portion 15a to an end of which an end of the inner cable of the adjustment cable 16 is attached.

From the lever supporting base 70 is extended a cable holder 73 to an end of which an end of the outer cable of the adjustment cable 16 is attached.

Accordingly, the manipulating lever 15 normally is rotated in the clockwise direction (as shown in FIG. 9) by means of the torsion spring 72, while the inner cable of the adjustment cable 16 is in a pressed condition.

If the manipulating lever 15 is moved in the counterclockwise direction against the force of torsion spring 72, the inner cable of the adjustment cable 16 is tensioned, whereby the stopper arms 23 on the left and right sides are pivoted and the lock is released. If the manipulating lever is released, the inner cable is pressed naturally by the torsion spring 72 or by the torsion spring 32 of the foot rest side, thereby to be capable of bringing about a lock actuating condition.

As already mentioned, when the inner cable of the adjustment cable 16 is pulled by the manipulation of the manipulating lever 15, the stopper arm 23 of the lock mechanism swings upwardly to release the lock Referring to FIG. 6, when the stopper arm 23 swings upwardly to release the fitting of the slide pin 35 and the cut out portion 30a, foot rest 12 is retained in the lifting position by means of the tension spring 53. However, when foot rest 12 is to be trod on from above, it can fall straight down, while receiving appropriate resistance from the torsion spring 53.

After foot rest 12 has been moved to the desired elevation, the force having permitted pivoting of the manipulating lever 15 is removed, the stopper arm 23 swings downwardly, whereby, since slide pin 35 is fitted and retained in either cut-out portion 30b or 30c of the stopper arm 23, link members 21, 22 are fixed and foot rest 12 is kept at the desired elevation.

In the present embodiment, cut out portions 30a, 30b, 30c of the stopper arm 23 are provided at three positions and the lock holding mechanism has three positions, whereby the height of the plate 65 can be set at the three positions, i.e., a lifting position, an intermediate position and a dropped position When it is desired to change the height of the plate 65 from the intermediate position or the dropped position to the lifting position, if the stopper arm 23 is swung upwardly, the plate 65 is automatically displaced up to the lifting position. Then, if the manipulating lever 15 is released, plate 65 is retained in the lifting position.

As already mentioned, in the present embodiment, the rider can simply adjust the height of the foot rest 12 by manipulation of the manipulating lever 15 and the tread of plate 65 while the motorcycle is moving, so that the foot rest can be set at a position that is considered to be optimal in terms of the physical build of the rider and the travel conditions of the motorcycle. This makes it possible to obtain increased comfort with less fatigue.

For example, on longer trips, the foot rest is set in the high position, whereby the rider can overcome discomfort in the region of the hip by bracing his legs and raising his waist and discomfort in the region of the knees by changing their bending angle through upward and downward displacements of the foot rest position.

During city travel, with its frequent starts and stops, the foot rest is set in the high position, enabling the rider to brace his legs.

FIGS. 10 and 11 show a movable foot rest device which, like the embodiment described above, provides three height settings and is capable of easy setting in an intermediate position.

FIG. 10 shows the shape of a bore 80a limiting the swing of a manipulating lever provided in a cover member 80 mounted on the right side of the vehicle body, and reference numeral 81 shows the manipulating lever in its position.

The bore 80a extends horizontally, and the vertical width in the front half is twice as wide upwardly than that in the rear half.

The manipulating lever 81 is energized in the upward direction to be capable of swinging in front and rear directions. When the manipulating lever 81 is swung from a front position 1 to the rear, the manipulating lever is stopped at edge 80b bordering the front and rear portions of bore 80a, in an intermediate position 2. Then, when manipulating lever 81 is depressed, it is disengaged from edge 80b and can move to position 3 by further swinging in the rearward direction.

Accordingly, it is easy to pull the inner cable of the adjustment cable in two stages.

Figure 1:
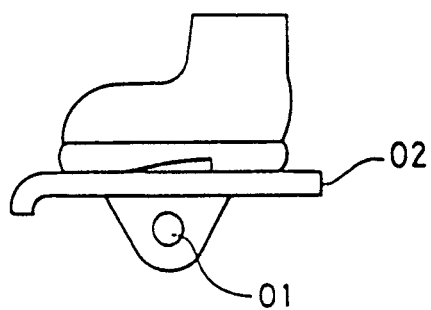
FIG. 1 is a side view of a rotary foot rest according to the prior art.

The shape of a stopper arm 82 swung by the circular hole 31 through the intermediary of the adjustment cable is shown in FIG. 1.

The stopper arm 82 is formed by a plate-like body of a generally triangular shape, one of its lower corners being pivotably mounted on a bearing pin 84 and an end of the inner cable of the adjustment cable being attached to its upper corner.

Three recesses 82a, 82b, 82c are provided in the lower edge of the stopper arm 82, a projecting portion 83 extending downwardly from between recesses 82a and 82b.

As already mentioned, since the inner cable 85 is pulled in two stages, the stopper arm 82 also has two swinging positions, as indicated by chain-dotted lines 82' or 82".

In the lock retaining condition shown in full lines, a slide pin 86 energized in a leftward direction in FIG. 11 is fitted into and held in any of the recesses and, when manipulating lever 81 is swung up to the intermediate position 2 of the first stage, the stopper arm 82 swings up to the chain-dotted line position 82'. Slide pin 86 can now be displaced between recesses 82b and 82c, but slide pin 86 is prevented from displacing between it and recess 82a by projecting portion 83.

When the manipulating lever 81 is moved to the rear position 3 of the second stage, since the stopper arm 82 is adapted to displace up to chain-dotted line position 82", slide pin 86 can be displaced between all of recesses 82a, 82b, 82c.

Thus, because of the two stage operations of the manipulating lever 81 and the projecting portion 83 of the stopper arm 82 when slide pin 86 is displaced from recess 82c to recess 82b, if the manipulating lever 81 is swung up to the intermediate position 2 slide pin 86 is displaced to recess 82b, whereby the positioning of slide pin 86 with respect to intermediate recess 82b is easy to manipulate.

In the embodiment just described, the foot rest is adapted to be set at three elevations, i.e., upper, intermediate and lower positions, but a further intermediate height position can be provided.

A variant of the foot rest lifting mechanism will now be described with reference to FIGS. 12 to 14.

Each of these figures shows a mechanism which comprises a supporting base 90, a foot rest holder 91 and link members 92, 93 interposed between the supporting base 90 and the step holder 91.

Figure 12:
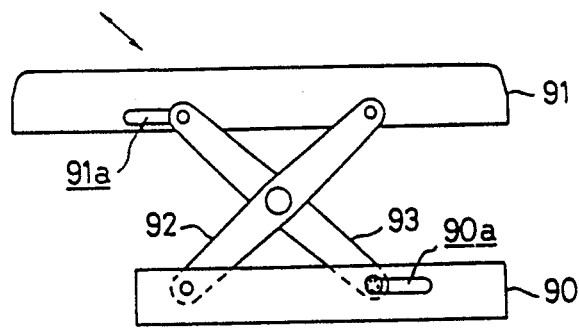
FIG. 12 is a schematic view showing another embodiment of the foot rest lifting mechanism.

In the embodiment illustrated in FIG. 12, on the supporting base 90, a lower end of link member 83 is pivotably supported in a fixed position. A lower end of the link member 93 is guided in a slot 90a for sliding movement in front and rear directions. However, on the foot rest holder 91 lying above, an upper end of link member 92 is pivotably supported in fixed position, and an upper end of link member 93 is slidably fitted in a slot 91a.

Accordingly, since the upper and lower ends of the link member 92 are pivotably supported, respectively, on the supporting base 90 and foot rest holder 91, when link member 92, 93 move toward a vertical position, foot rest holder 91 rises as shown by an arrow, and at the same time moves in a forward direction.

Thus, the footrest position is capable of simultaneous displacement in up-and-down and front and rear directions.

According to one example, supposing that the lower position of the footrest is the standard position, then the upper position might be ca. 6 cm higher and ca. 2 to 2.5 cm forwardly.

Figure 13:
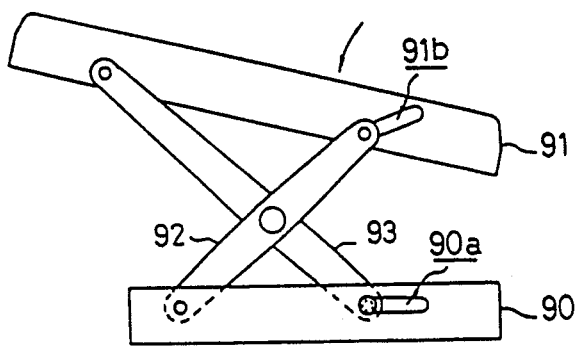
FIG. 13 is a schematic view showing a further embodiment of the foot rest lifting mechanism.

The embodiment shown in FIG. 13 has the same fundamental structure as the embodiment illustrated in FIG. 6, but a link member 93 extending forwardly from the portion pivotably supported on link member 92 is especially long, and the slot 91b in footrest holder 91 into which the upper end of link member 92 fits is inclined.

Thus, footrest holder 91 is parallel to the supporting base 90 when in its lower position, but is inclined as it rises and with its front end tilting upwardly.

When the rider rests his foot on the footrest in high position, in which the knee is greatly bent, comfort is obtained by bending of the ankle, and the foot can be comfortably rested on the footrest because the latter is inclined.

Figure 14:
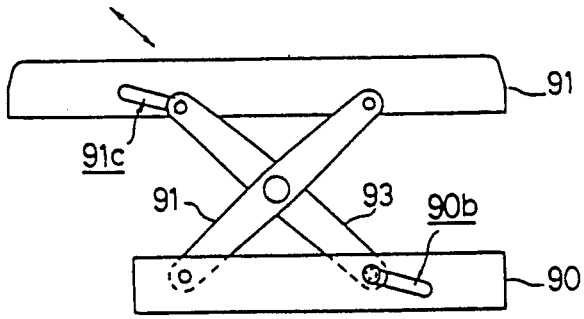
FIG. 14 is a schematic view showing a still further embodiment of the foot rest lifting mechanism.

The embodiment illustrated in FIG. 14 has the same fundamental structure as to embodiment illustrated in FIG. 12, but here slots 90b, 91c provided in the supporting base 90 and the footrest holder 91 are inclined in the same direction.

Such inclined slots make it possible to transmit the force depressing footrest 91 against the force of the spring to sliding of the upper and lower ends of the link member 93 without great resistance, whereby the force pressing up the footrest holder 91 is reduced and it is possible to reduce the effort of the rider.

Figure 15:
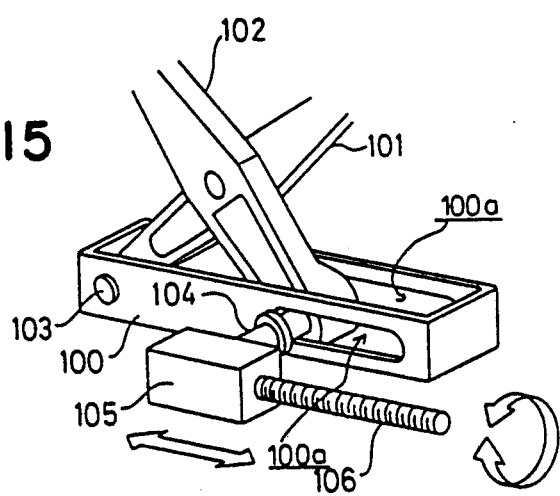
FIG. 15 is a perspective view showing essential parts of a foot rest lifting mechanism according to yet another embodiment.

In the foregoing embodiments, the upper and lower positions of the footrest have been adjusted by foot pressure of the rider after he has manipulated the manipulating lever. Motorized movement of the footrest will now be described with reference to FIG. 15, which shows essential parts of a footrest lifting mechanism, including a lower supporting base 100 consisting of an upwardly open rectangular box. In the lower supporting base 100 are loosely fitted the lower ends of link members 101, 102 combined in X-shape. The lower end of one link member 101 is pivotably supported by a bearing pin 103, and into the lower end of the other link member 102 is fitted a slide pin 104 which passes through an elongated hole 100a provided in left and right side walls of the supporting base 100 and which is guided in slot 100a for sliding movement in front and rear directions.

On an end projecting from the slide pin 104 is fixed a female thread screw member 105 integrally with the slide pin 104, a thread screw rod 106 being threadedly screwed into the female thread screw member 105 to direct in the front and rear directions.

When the thread screw rod 106 is rotated by positive and reverse rotations of a motor (not shown), since the female thread screw member 105 displaces integrally with the slide pin 104 in the front and rear directions, the link members are cause to pivot, whereby the footrest moves up and down.

The load applied to the footrest by resting the foot can be fully maintained by screwing between the female thread screw member 105 and the thread screw rod 106.

Further, a switch for driving the motor may be provided at a position of the manipulating lever in the aforesaid embodiments or at a position in which the rider can easily manipulate it.

Thus, according to the up and down movements of the footrest by the motor drive, the height of the footrest can be adjusted smoothly without changing it step by step, and can be retained at any desired position, i.e., at the optimum position for the particular rider.

Since the present invention makes it possible to simply adjust the upper and lower positions of the footrest by manipulating the manipulating knob during travel and to position it by movement of the foot, it is very convenient for the rider, in that comfort can be obtained and fatigue can be reduced, by adjustments in accordance with the physical constitution of the rider and the conditions of travel.

We claim:

1. Means for adjusting the position of a foot rest of a motorcycle, said means comprising:
   (a) supporting means adapted to move said foot rest upwardly and downwardly, said supporting members comprising a pair of link members connected for pivoting movement relative to one another under ends of the said link members being operatively connected to a base support, and upper ends of said link members being operatively connected to a foot rest plate;
   (b) means for continuously biasing said foot rest in an upward direction;
   (c) means for selectively positioning said foot rest at a plurality of elevations;
   (d) lock means adapted to maintain said foot rest at a selected elevation;
   (e) manipulating means mounted on a body of said motorcycle; and
   (f) transmission means extending from said manipulating and connected to said lock means.

2. Means according to claim 1, wherein said link members are adapted both to raise and lower said foot rest plate and to displace it in forward and rearward directions.

* * * * *